D. E. CREECH.
PISTON RING.
APPLICATION FILED MAR. 10, 1919.
1,388,631.
Patented Aug. 23, 1921.
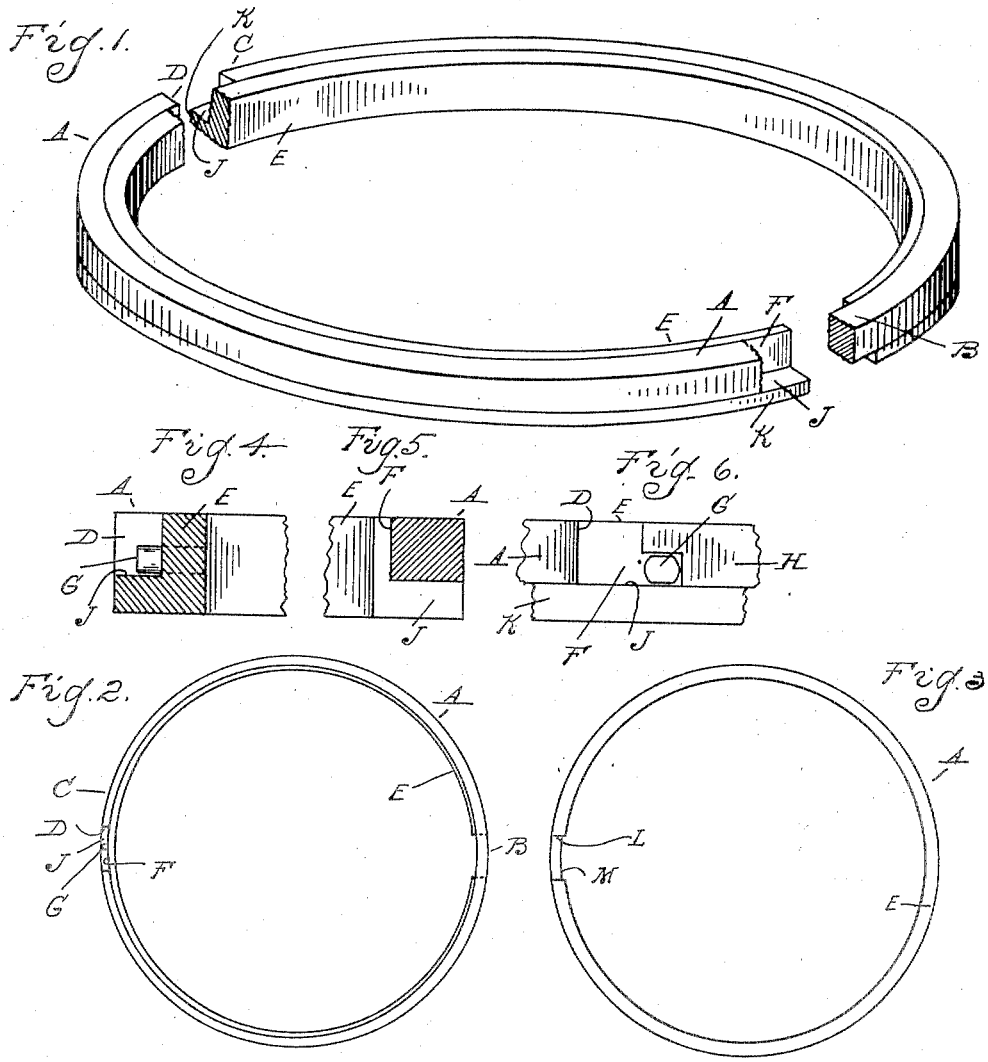
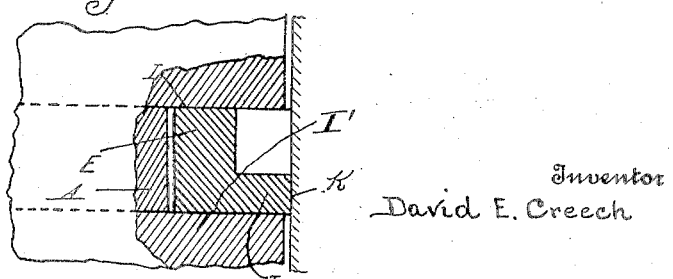
Inventor
David E. Creech
By Whittemore Hulbert & Whittemore
Attorneys

UNITED STATES PATENT OFFICE.

DAVID E. CREECH, OF JACKSON, MICHIGAN.

PISTON-RING.

1,388,631.  Specification of Letters Patent.  Patented Aug. 23, 1921.

Application filed March 10, 1919. Serial No. 281,696.

*To all whom it may concern:*

Be it known that I, DAVID E. CREECH, a citizen of the United States of America, residing at Jackson, in the county of Jackson and State of Michigan, have invented certain new and useful Improvements in Piston-Rings, of which the following is a specification, reference being had therein to the accompanying drawings.

The invention consists in the peculiar construction of a piston ring which combines various advantages as hereinafter set forth.

In the drawings:

Figure 1 is a sectional perspective view of the ring;

Fig. 2 is a top plan view thereof;

Fig. 3 is a bottom plan view;

Figs. 4 and 5 are cross-sections through the ring on diametrically opposite sides thereof in the planes of the respective splits;

Fig. 6 is a side elevation of Fig. 4;

Fig. 7 is a cross-section through the ring in the piston and within the cylinder.

In the construction of split piston rings it is advantageous to form the inner and outer surfaces eccentric so as to produce a wide section at a point diametrically opposite from the split with a gradual taper toward the split. This causes the ring when contracted in diameter to more perfectly fit the cylinder. My improved construction includes such an eccentric or tapered ring but combines with it a complementary eccentric or tapered ring, one of said members being rabbeted to receive the other so as to form a seal across the split.

In detail A is a ring member which is rectangular in cross-section and which has inner and outer cylindrical surfaces in eccentric relation to produce a wide section at one point B and a narrow section at a diametrically opposite point C with a gradual taper therebetween. The narrow section is cut away at D forming a gap of sufficient width to permit of contracting the ring and placing the same under resilient tension. E is a complementary ring of L-shaped cross-section having a groove or rabbet F for receiving the ring A. The ring E has the horizontal flange thereof formed with concentric inner and outer edges, but the inner and outer faces of the vertical portion of the L are eccentric. The proportion of the parts is also such that the widest point in the eccentric portion of the ring E is substantially equal to the narrowest portion of the ring A, while the narrowest part of the eccentric portion of the ring E is very thin, differing gradually from the width of the adjacent portion of the ring A. The reason for the construction just described is that the horizontal flange on the ring E, which has concentric inner and outer edges, will so reinforce the eccentric portion of this ring as to require the reduction in cross-section of the latter; otherwise the ring E would be much stiffer than the ring A. It is, however, an object of my invention to form the rings A and E of substantially equal tension and this is produced by the relatively thin walls of the eccentric portion of the ring E.

When the rings A and E are placed in engagement with each other they will produce a composite ring of rectangular cross-section substantially uniform throughout its extent. The rings are held properly positioned by a stop pin G, preferably located in the rabbet F and between the ends of the ring A. One end, H, of the ring A is preferably notched to receive this stop pin so as to permit the complete closing of the gap between the ends.

In use, when the composite ring is placed in the groove of a piston, such as I, the flange J of the ring E which bridges the split in the ring A will form a sealing joint with the adjacent side I' of the piston groove, while the outer face K of this flange will form a sealing joint with the cylinder. On the diametrically opposite side of the composite ring the faces L and M, respectively at the side and the periphery of the ring A, will form seals for the gap in the ring E. There is therefore no chance for leakage at any point and inasmuch as each of the rings is eccentric and tapering in cross-section the composite ring will conform to the exact surface of the cylinder. Also the fact that the rings are of equal tension insures uniform bending.

What I claim as my invention is:

1. A piston ring, comprising members having portions of complementary eccentric form, the combined members having concentric inner and outer faces, one of said members being of L-shaped cross-section with the laterally extending portion of the L lying adjacent to the side of the other member, each of said members being split at the narrowest point of the eccentric portion thereof, and the relative proportions of the two members being such as to produce substantially equal tension upon contraction in diameter.

2. A piston ring, comprising members having complementary eccentric portions, the combined members having concentric inner and outer faces and each member being split at the thinnest point of its eccentric portion, one of said members being of L-shaped cross-section with the laterally extending portion thereof lying adjacent to the side of the other member, and the eccentric portion of the said L-shaped member being relatively thinner than the eccentric portion of the complementary member so that the tension upon contraction of said L-shaped ring is substantially equal to the tension upon equal contraction of the complementary ring.

In testimony whereof I affix my signature.

DAVID E. CREECH.